United States Patent [19]

Ireland

[11] Patent Number: 5,040,401
[45] Date of Patent: * Aug. 20, 1991

[54] RE-ROD BENDER

[76] Inventor: Ralph Ireland, Rte. 4, Mankato, Minn. 56001

[*] Notice: The portion of the term of this patent subsequent to Aug. 7, 2007 has been disclaimed.

[21] Appl. No.: 561,889

[22] Filed: Aug. 1, 1990

Related U.S. Application Data

[63] Continuation-in-part of Ser. No. 199,381, May 27, 1988, Pat. No. 4,945,751.

[51] Int. Cl.$^5$ .............................................. B21D 7/03
[52] U.S. Cl. ..................................... 72/389; 72/453.01
[58] Field of Search .................. 72/384, 389, 477, 332, 72/464, 478, 453.01; 83/196, 197, 198, 566, 567

[56] References Cited

U.S. PATENT DOCUMENTS

| | | | |
|---|---|---|---|
| 1,964,550 | 6/1934 | Abramson et al. | 72/389 |
| 2,867,261 | 1/1959 | Traupmann | 72/389 |
| 3,124,192 | 3/1964 | Williams et al. | 72/389 |
| 3,724,256 | 4/1973 | Kroetch | 72/332 |
| 4,004,445 | 1/1977 | Larson | 72/389 |
| 4,041,753 | 8/1977 | Hix | 72/464 |
| 4,265,106 | 5/1981 | McMaster et al. | 72/389 |
| 4,506,535 | 3/1985 | Eubanks | 72/389 |
| 4,638,703 | 1/1987 | Muhr | 72/464 |
| 4,788,847 | 12/1988 | Sterghos | 72/389 |
| 4,945,751 | 8/1990 | Ireland | 72/389 |

FOREIGN PATENT DOCUMENTS 972936  8/1975  Canada .................................. 72/332
8804967 7/1988  PCT Int'l Appl. .

OTHER PUBLICATIONS

"Cut and Bend Rebard with Fascut" Fascut Industries, Rte. 2, Box 54A, Sauk City, WI 53583.

Primary Examiner—David Jones
Attorney, Agent, or Firm—Palmatier & Sjoquist

[57] ABSTRACT

The present fabrication apparatus includes pivotable die blocks and a stationary half-moon male die for bending re-rods. Front inner portions of the pivotable die blocks bring over-center pressure on a bent rod so as to control the tendency of a bent rod to spread after removal from the die blocks. The pivotable die blocks are mounted in a housing with a threaded pin connector for drawing the pivotable die blocks toward and away from each other to adjust the housing to bend rods to a variety of radii. The housing further includes upper and lower plates sandwiching each of the pivotable die blocks. Parallel ridges are formed in confronting surfaces of the upper plate and a transverse bar to increase the capability of the transverse bar to prevent the housing from being spread apart as a rod is being bent.

11 Claims, 4 Drawing Sheets

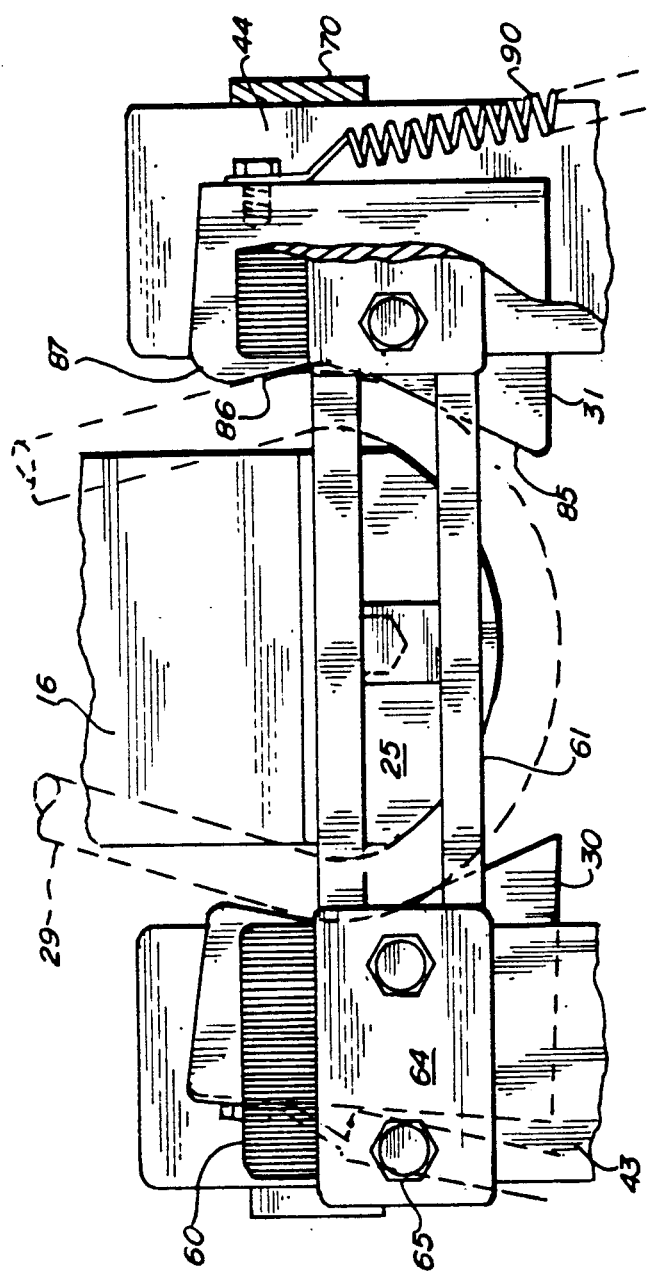
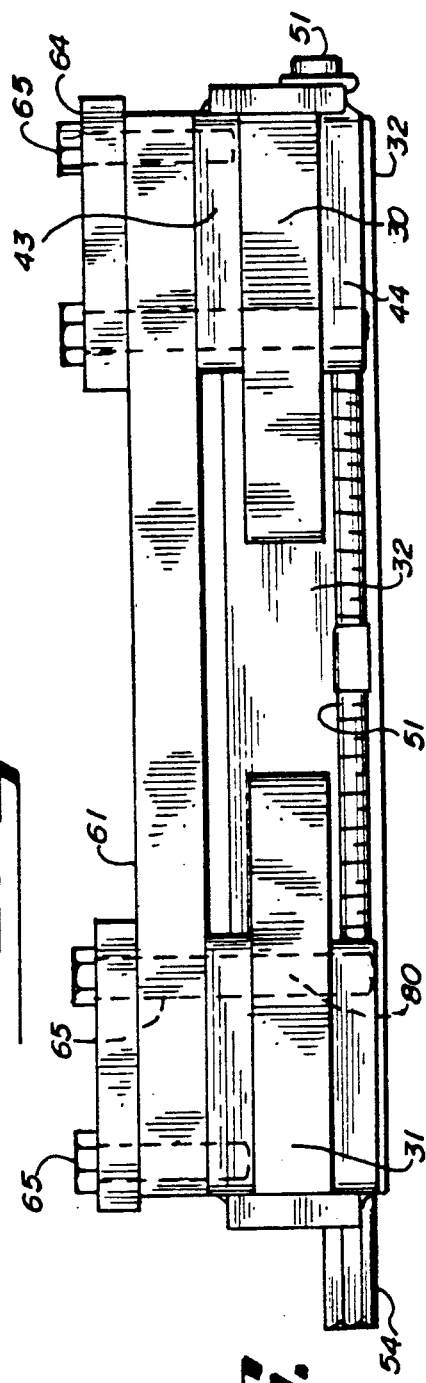

RE-ROD BENDER

This application is a continuation in part of my prior co-pending application for patent Ser. No. 199,381, filed May 27, 1988, now U.S. Pat. No. 4,945,751.

The present invention relates to fabrication apparatus for reinforcing rods and, more particularly to fabrication apparatus for bending reinforcing rods.

BACKGROUND OF THE INVENTION

In the concrete reinforcing steel industry, specifications exist for bending reinforcing rods of different diameters to certain bend angles and to particular bend diameters. Rod diameters may range from ⅜ to 2¼ inches. Bend angles may range from 0°-360°. Bend diameters may extend from 2¼ to 24 inches.

Reinforcing rods are typically bent or cut by a fabricator who may be located a great distance from the site the reinforcing rods are needed. For example, highway construction crews building freeways and bridges work in remote regions removed from even local industry. For such crews, on site construction may be delayed by waiting for rods to be cut or bent to prescribed specifications.

SUMMARY OF THE INVENTION

A feature of the present invention is a provision in a fabrication apparatus having a pair of pivotable die blocks confronting a third male die block in between which a rod is bent, of each of the pivotable die blocks having an inner angled side extending continuously from a rear end to a front end of the die block wherein the distance between the front portions of the pivotable die blocks is greater than the width of the third die block such that the front portions pivot to either side of the third die block to apply over-center pressure to a rod being bent.

Another feature is the provision in such a fabrication apparatus, of rear portions of the inner angled sides being linear and extending rearwardly and inwardly relative to the front end of its respective die block such that the rear portions converge toward each other to confront the rod being bent.

Another feature is the provision in such a fabrication apparatus, of means for biasing each of the pivotable die blocks toward the third die block such that rear portions of the inner angled sides continuously are in position to confront the third die block.

Another feature is the provision in such a fabrication apparatus, of each of the pivotable die blocks being sandwiched between a pair of upper and lower plates and of the two pairs of plates being joined by transverse members which allow for transverse adjustment of the plates and die blocks for bending rods to a variety of radii.

An advantage of the present invention is that rods of different diameters may be bent without adjusting the distance between the pivotal die blocks.

Another advantage is that the distance between the pivotal die blocks is readily adjusted so as to bend even a greater number of rods with different thicknesses.

Another advantage is that the pivotal die blocks may be spaced apart at a number of incremental adjustment settings with rods of different diameters being bent at each of the incremental adjustment settings.

Another advantage is that the die blocks are continuously in position for accepting rods to be bent via a biasing means urging certain of the die blocks to a starting position. Another advantage is that the die blocks and their housing are durable and withstand great bending pressures which bring transverse spreading pressures to bear on the housing of the die blocks Another advantage is that the die blocks and housing therefor are relatively inexpensive and simple to operate.

BRIEF DESCRIPTION OF THE DRAWINGS

FIG. 6 is a rear elevation view of the die blocks at lines 6—6 of FIG. 2.

FIG. 7 is a top plan view of the die blocks of FIG. 2 in a closed position.

DETAILED DESCRIPTION OF THE PREFERRED EMBODIMENTS

Figure 1:
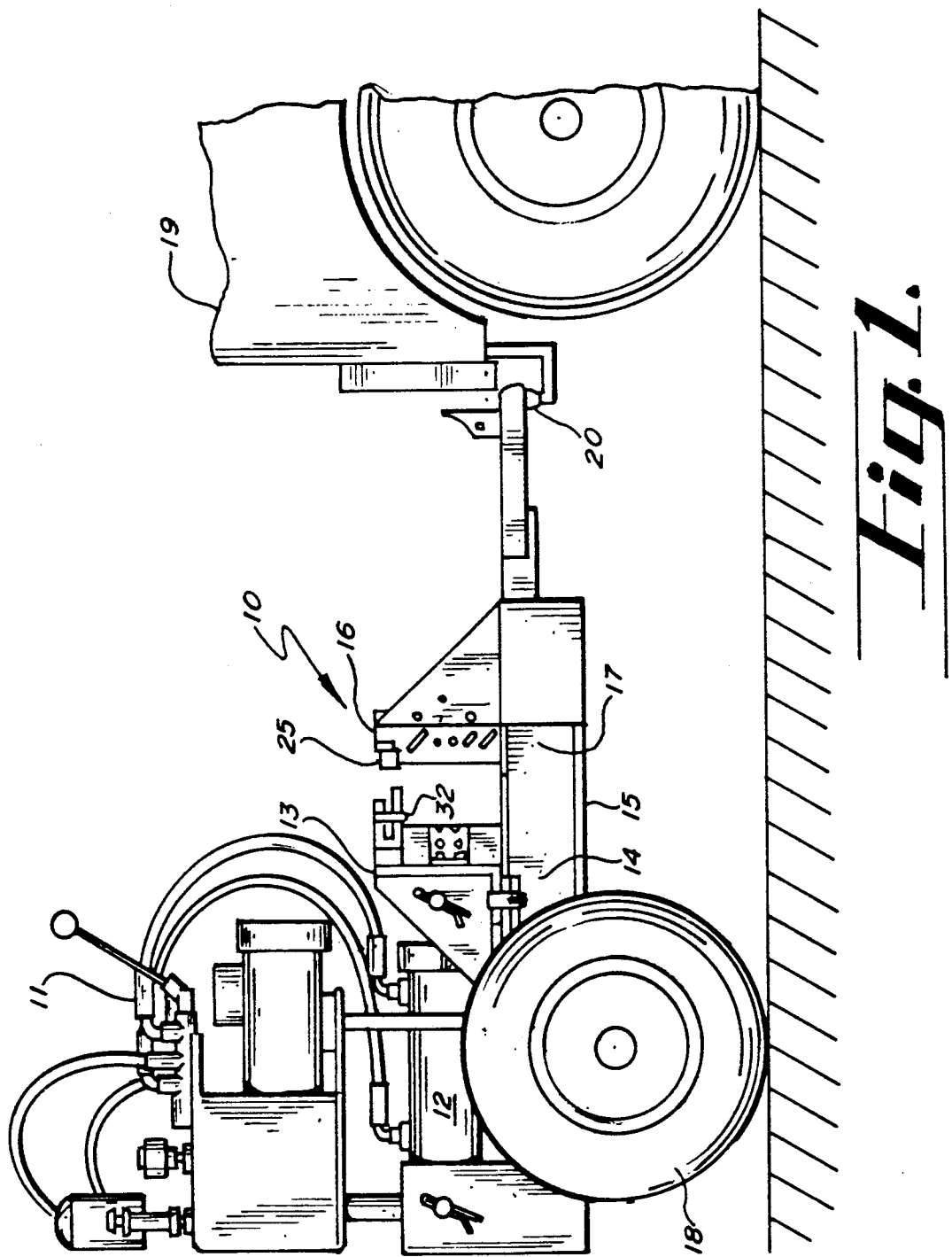
FIG. 1 is an elevation view of a cutter and bender fabrication apparatus.
Figure 2:
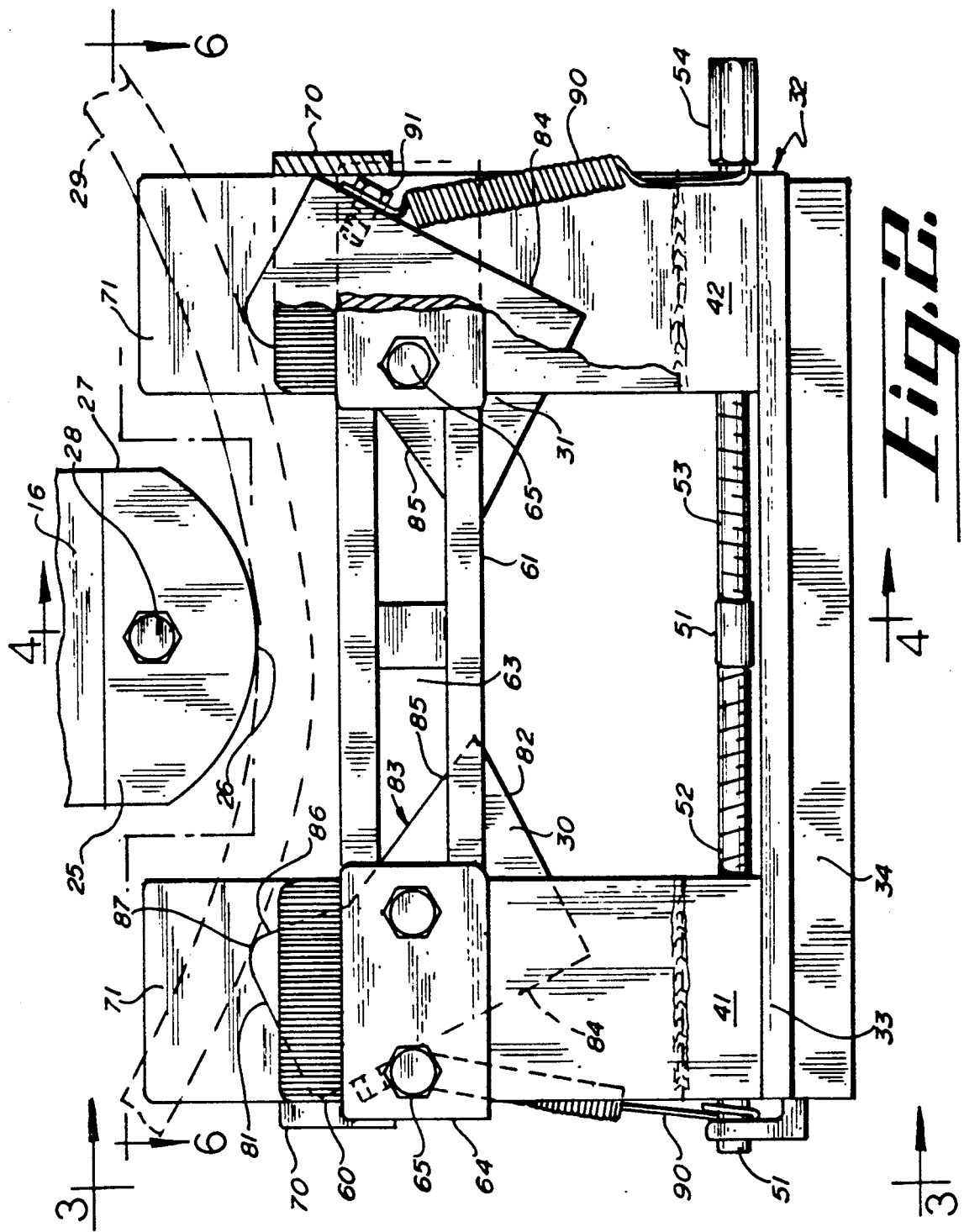
FIG. 2 is a top plan view of the die blocks of the apparatus is FIG. 1 in an open position.
Figure 3:
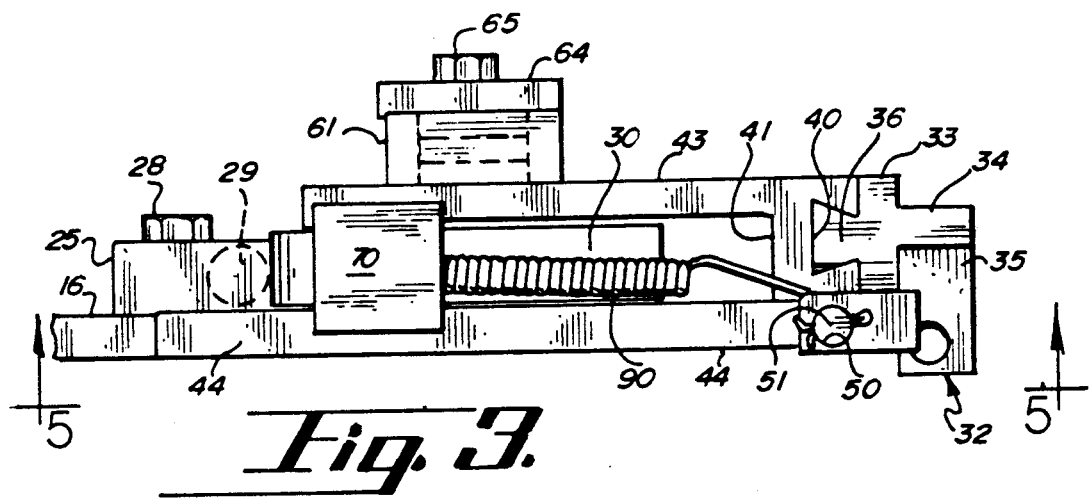
FIG. 3 is an end view of the die blocks at lines 3—3 of FIG. 2.
Figure 4:
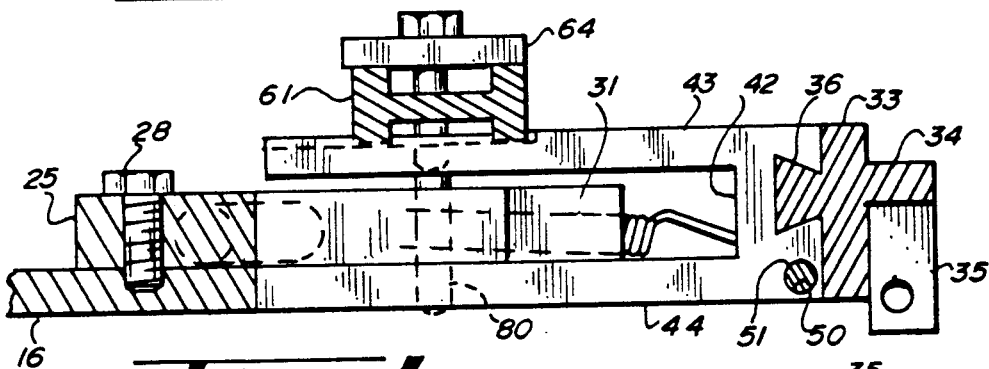
FIG. 4 is a section view of the die blocks at lines 4—4 of FIG. 2.
Figure 5:
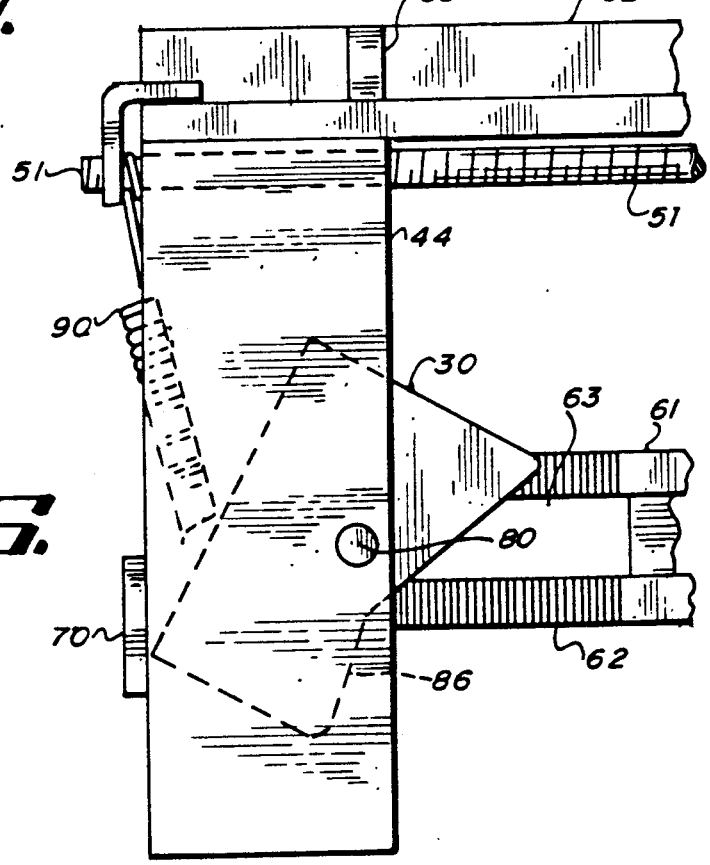
FIG. 5 is a bottom plan, partial view of the die blocks at lines 5—5 of FIG. 3.

As shown in FIG. 1, a fabrication apparatus is generally indicated by the reference numeral 10 and includes a hydraulic control unit 11 with a hydraulic cylinder 12 and ram 13 slidably mounted on one end 14 of an I-beam 15. A stationary anvil 16 is fixedly mounted on the other end 17 of the I-beam 15. The ram 13 and anvil 16 are operating portions of the frame, relatively movable convergently and divergently with respect to each other. The fabrication apparatus 10 is mounted on a pair of wheels 18 and may be towed by a vehicle 19 via a hitch 20. The fabrication apparatus 10 is described in greater detail in the parent application Ser. No. 199,381 filed May 27, 1988, which is hereby incorporated by reference.

A stationary half-moon male die block 25 is removably mounted on the anvil 16. The die block 25 includes a curved rod shaping front face 26 and side portions at edges 27. The distance between side edges 27 define a width of the die block 25. The die block 25 is removably mounted to the anvil 16 via a pin connector 28 extending into the anvil 16. The half-moon die block 25 is formed of a hardened metal and the front face 26 and side edges 27 bear against a reinforcing rod 29 to be bent.

A pair of pivotable die blocks 30, 31 are affixed in a generally U-shaped housing 32 which is mounted on the ram 13 of the fabrication apparatus 10. The housing 32 includes a rear transverse bar 33 with an integral horizontal portion 34 and integral vertical portions 35 for mounting the housing 32 on the ram 13. The rear transverse bar 33 further includes an integral horizontal trapezoidal portion 36 having a cross-section which is trapezoidal.

The trapezoidal portion 36 is received in a trapezoidal opening 40 formed in a pair of respective vertical blocks or pieces 41-42. Each of the blocks 41, 42 is a base to which is welded an upper plate 43 and a lower plate 44. The plates 43, 44 extend forwardly from their respective blocks 41, 42 to mount one of the pivotable die blocks 30, 31. Each of the pivotable die blocks 30, 31 is sandwiched between one pair of plates 43, 44.

As well as forming a trapezoidal opening 40, each of the vertical blocks 41, 42 includes a threaded opening 50. One of the threaded openings 50 in one of the blocks 41, 42 includes a right-hand thread; the other threaded opening 50 in the other of the blocks 41, 42 includes a left-hand thread. The threaded openings 50 receive a threaded pin connector 51. A one-half section 52 of the threaded pin connector 50, 51 includes a right-hand thread for cooperating with one of the vertical blocks or pieces 41, 42; the other half-section 53 of the pin connector 51 includes a left-hand thread for cooperating with the other of the blocks 41, 42. By turning a hexagonal end 54 of the threaded pin connector 51 in one direction, the pieces 41, 42 and hence the pivotable die blocks 30, 31 are drawn together for bending rods to a smaller diameter. When the pin connector 51 is turned in the other direction, the die blocks 30, 31 are drawn apart to bend rods to a greater diameter.

A portion of the upper surface of each of the upper plates 43 includes a plurality of ridges 60. The ridges 60 run forwardly and rearwardly in the direction of movement of the ram 13. Affixed to and between the ridge portion 60 is a bifurcated transverse bar 61. The bottom surface of the bar 61 includes a plurality of parallel ridges 62. Ridges 62 run parallel to ridges 60 and the ridges 60, 62 confront each other when the bifurcated transverse bar 61 is tightened to and between the upper plates 43. The bifurcated bar 61 includes bolt-receiving slots 63.

The bifurcated transverse bar 61 is pinched between the upper ridged surface 60 of the upper plates 43 and a pair of hold-down plates 64 mounted on either end of the bar 61. Threaded pin connectors 65 extend from the plate 64, through the slot 63 of the bar 61, and into the upper plates 43. Before the pairs of plates 43, 44 are drawn apart or together by the threaded pin connector 51, pin connectors 65 are loosened to allow transverse movement of the plates 43, 44 relative the bifurcated transverse bar 61. When the pin connectors 65 are tightened to pinch the bifurcated bar 61 between the hold-down plate 64 and the upper plates 43, the transverse bar 61 prevents the pairs of plates 43, 44 from spreading transversely when the rod 29 is being bent.

It should be noted that each of the pairs of plates 43, 44 is rigidly joined by a stop plate 70. The stop plate 70 is welded to outer edges of the upper and lower plates 43, 44. It should also be noted that the lower plates 44 are greater in length than and extend forwardly of the upper plates 43 to provide a rod bearing surface 71 on which the rod 29 lies as it is being bent.

Each of the pivotable die blocks 30, 31 is pivotally mounted between the upper and lower plates 43, 44 via pivot pin 80 which extends between and is mounted in the plates 43, 44. Each of the die blocks 30, 31 includes front and rear ends 81, 82 and inner and outer sides 83, 84. Each of the inner sides 83 is angled and includes a rear face portion 85 which extends rearwardly and inwardly at an obtuse angle relative to the direction of movement of the ram 13, such that the rear portions 85 converge toward each other when the die blocks 30, 31 are in an open position. Each of the inner sides 83 further include a front face portion 86 extending forwardly and slightly inwardly and a rounded edge 87 leading into the front edge 81. The distance between rearward most sections of the rear portions 85 are less than the width of the stationary die block 25 to confront the stationary die block 25 and initiate pivoting of the blocks 30, 31 when the rod 29 is being bent. The distance between respective front portions 86 are greater than the width of the stationary die block 25 to bring over-center pressure to bear on the rod 29 when the die blocks 30, 31 are pivoted.

The housing 32 further includes a biasing means or coil spring 90 fixed between outer edges 84 of the blocks 30, 31 and the pin connector 51. The coil springs 90 continuously bias the blocks 30, 31 to an open position where the angled sides 83 continuously are in position to confront the stationary die block 25. Each of the coil springs 90 is affixed to the edge 84 of the blocks 30, 31 via a threaded pin connector 91, the head of which is bearable against stop plate 70. The pin connector 91 is adjustable to extend away from the outer side 84 of each of the die blocks 30, 31 to adjust the position of the rounded corners 87 relative the rod 29. It is desirable that the rod 29 bears initially against the rounded edges 87 rather than the front ends 81 to smoothly draw and bend the rod between the die blocks 30, 31.

In operation, the half-moon die block 25 of a prescribed width for bending the rod 29 to the prescribed radius is mounted on the stationary anvil 16 with the pin connector 28. The pin connectors 65 of the housing 32 are then loosened so that the width between the pivotable die blocks 30, 31 may be adjusted by turning end 54 of the pin connector 51. When the pivotable die blocks 30, 31 are drawn to their prescribed positions corresponding to the width of the half-moon die block 25, the pin connectors 65 are tightened so as to pinch the bifurcated bar 61 between the hold-down plate 64 and the upper plates 43. As the bifurcated bar 61 is pinched, the ridge portion 60, 62 of the upper plates 43 and bar 61 confront each other to maximize contact between the bifurcated bar 61 and the upper plates 43 such that a spreading apart of the opposing pairs 41, 42 of the plates 43, 44 is minimized. Subsequently, the rod 29 is placed on the rod bearing surfaces 71 of the lower plates 44 and the hydraulic control means 11 is operated to operate the hydraulic cylinder 12 to drive the ram 13 forwardly on the I-beam 15. As the housing 32 converges on the half-moon male die block 25, the rod 29 bridges across and between and is brought to bear on the rounded corners 87 of each of the pivotal die blocks 30, 31 and the curved front surface 26. As the die blocks 30, 31 and half-moon die block 25 are further drawn together, the rod 29 begins to bend and protrude between the die blocks 30, 31 and bear against the rear portions 83 of the pivotable die blocks 30, 31. As pressure is brought to bear on the rear portions 83 by the bent rod 29, the pivotable die blocks 30, 31 pivot such that the front edges 86 bring an over-center pressure to bear on the bent rod 29 so as to bend portions of the rod 29 behind the half-moon die 25. When the ram 13 has been extended a sufficient distance to bend the rod 29 to the prescribed radius, the hydraulic control means 11 is operated to reverse the direction of the cylinder 12 and ram 13 so as to draw the pivotable die blocks 30, 31 and the half-moon die block 25 apart. As the ram 13 and housing 32 are retracted, the coil springs 90 draw pivotable die blocks 30, 31 to their original opened position and the bent rod 29 is removed from the housing 32.

It should be noted that the pivotal die blocks 30, 31 may be incrementally spaced apart by the pin connector 51 at a plurality of settings. At each of the settings, rods of different diameters may be bent without changing the male die block 25 or the setting, i.e. the distance between the die blocks 30, 31.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A fabrication apparatus for bending rods, comprising a frame having first and second operating portions relatively movable convergent and divergently relative to each other, powered means for convergent and divergently moving the operating portions, a rod engaging male die block on said first operating portion and having an elongate and curved rod engaging and shaping face, and the die also having side portion around which the rod is wrapped as the rod is bent to a radius around the curved shaping face, a pair of pivotal die blocks on the second operating portion and spaced from each other to receive said male die block therebetween during such relative convergent movement of the operating portion with such a rod being bent over the shaping face and around the side portions of the male die block, the pivotal die blocks comprising front, rear, inner and outer sides, each of the inner sides comprising front and rear elongate rod-engaging face portions confronting each other to receive the male die block and rod therebetween, the rear face portions being obliquely oriented to each other and to their respective front face portions, and each of the rear face portions engaging the rod being shaped during such convergent movement of the operating portions of the frame, the male die block and the rod thereon camming each of the rear face portions to swing each of the front face portions against the rod and to bend the rod around the side portions of the male die blocks.

2. The apparatus of claim 1, wherein the side portions of the male die block confront the elongate face portions of the pivotal die blocks, the pivotal die blocks being spaced from each other a distance to receive the male die block therebetween with the rod wrapped around the side portions of the male die blocks.

3. The apparatus of claim 1, wherein a retainer bar traverses between the front face portions of the pivotal die blocks and is spaced from the male die block to permit movement of the male die block between the pivotal die blocks.

4. The apparatus of claim 1, wherein the pivotal die blocks have mounting means permitting adjustment of the pivotal die blocks toward and away from each other to define a plurality of incremental adjustment settings, the distance between the die blocks being different for each of the adjustment settings whereby rods of different diameters may be bent to a variety of curvatures at each of the adjustment settings.

5. The apparatus of claim 4, wherein the male die block has releasable mounting means permitting replacement of the male die block with another male die block of different size.

6. The apparatus of claim 4, wherein a demountable retainer bar is releasably and adjustably affixed between the pivotal die blocks.

7. The apparatus of claim 1, wherein each of the rear face portions extending obliquely to the direction of movement of the male die and operating portions and the rod bridging across and between the front face portions as the operating portions move convergently for shaping the rod.

8. The apparatus of claim 1, wherein the frame includes upper and lower plates for sandwiching the pivotable die blocks therebetween, the frame having means for adjusting the distance between the pivotable die blocks to bend rods to a variety of curvatures.

9. The apparatus of claim 8, wherein the adjusting means includes a transverse bar extending between rear portions of the upper and lower plates, the rear portions of the upper plates being slidably adjustable on the transverse bar.

10. The apparatus of claim 8, wherein the adjusting means includes a transverse threaded pin connector running parallel to the transverse bar, one portion of the pin connector having right-hand threads to cooperate with a threaded portion of one of the rear portions, another portion of the pin connector having left-hand threads to cooperate with a threaded portion of the other rear portion such that the pivotable die blocks are drawable toward and away from each other when the pin connector is turned in one direction.

11. A fabrication apparatus for bending rods, comprising a frame, a ram on the frame, a curved die block on the frame and having a curved front edge extending between a pair of side edges, the distance between the side edges defining a width of the curved die block, a U-shaped housing on the frame, the housing including a rear bar with a trapezoidal mounting bar having a trapezoidal cross-section, the housing further including a pair of upper and lower die block mounting plates mounted on each end of the rear bar, each of the lower plates having a greater length than each of the upper plates for providing a rod bearing surface, each of the pairs of upper and lower plates joined by a vertical piece with a trapezoidal opening which cooperates with the trapezoidal mounting bar such that the upper and lower plates are slidable toward and away from each other on the trapezoidal mounting bar, the housing further having a threaded pin connector running parallel to the trapezoidal mounting bar and cooperating with threaded holes in the vertical pieces, one half of the threaded pin connector having right-hand threads for cooperating with one of the vertical pieces, the other half of the threaded pin connector having left-hand threads for cooperating with the other vertical piece such that the upper and lower plates are drawable toward and away from each other by turning the pin connector in one direction, the housing further including a transverse bar affixed between the upper plates forwardly of the rear bar, each of the upper plates and the transverse bar having confronting surfaces with parallel ridges running parallel to the directional movement of the ram, the confronting ridged surfaces frictionally bearing against each other to prevent the plates from spreading transversely from each other, and a pair of pivotable blocks, each of the blocks being sandwiched between one pair of upper and lower plates, each of the pivotable blocks including front, rear, inner and outer sides, each of the inner sides having front and rear portions and extending continuously from the front to rear sides, the distance between respective front portions of the inner sides being greater than the width of the curved die block to bring over-center pressure to bear on a rod being bent, the distance between respective rear portions of the inner sides being less than the width of the curved die block to confront the rod being bent and initiate pivoting of the pivotable die blocks and over-center pressure to bear on the rod being bent when the curved die blocks and pivotable die blocks are drawn toward each other by the ram, the distance between the die blocks being changeable by manipulating the threaded pin connector to define a plurality of incremental adjustment settings whereby rods of different diameters may be bent to a variety of curvatures at each of the incremental adjustment settings.

* * * * *